(No Model.)
J. W. WETMORE.
VEHICLE SPRING.
No. 325,033. Patented Aug. 25, 1885.
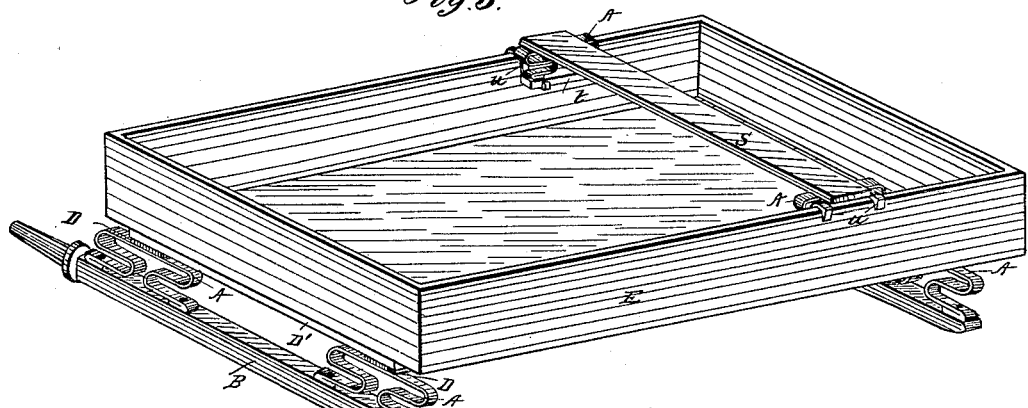
Fig. 5.
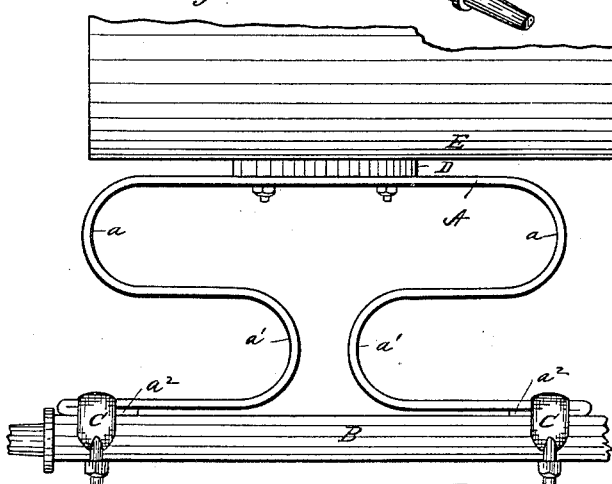
Fig. 1.
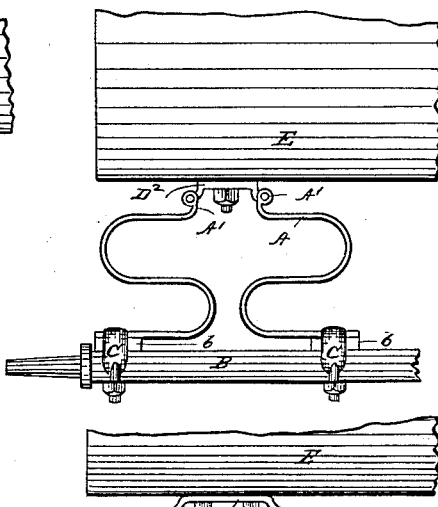
Fig. 2.
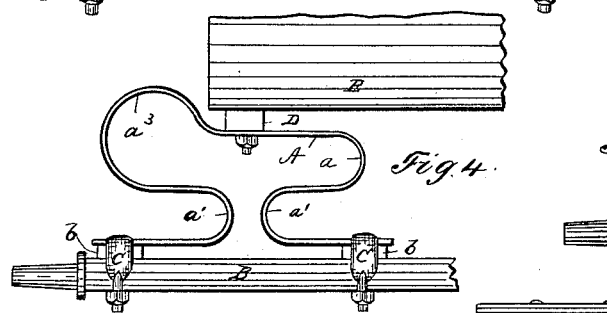
Fig. 4.
Fig. 3.
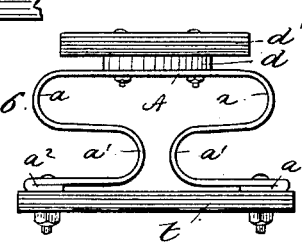
Fig. 6.
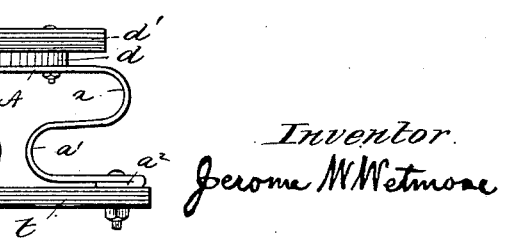
Witnesses.
W. R. Eddin.
S. J. Forster.
Inventor.
Jerome W. Wetmore

UNITED STATES PATENT OFFICE.

JEROME W. WETMORE, OF ERIE, PENNSYLVANIA.

VEHICLE-SPRING.

SPECIFICATION forming part of Letters Patent No. 325,033, dated August 25, 1885.

Application filed October 30, 1884. (No model.)

*To all whom it may concern:*

Be it known that I, JEROME W. WETMORE, a citizen of the United States, residing at Erie, in the county of Erie and State of Pennsylvania, have invented a new and useful Improvement in Vehicle-Springs, of which the following is a specification.

My invention relates to improvements in vehicle and seat springs constructed of a flat bar of steel with two or more reverse curves therein.

The objects of my improvement are, first, to construct a vehicle or seat spring of a single flat bar of steel, each half thereof being constructed of S-shaped curves; second, to construct a vehicle or seat spring of flat bar-steel, and with two double reverse curves therein, so that there are five or more straight operative yielding sections therein; third, to construct a vehicle or seat spring of flat bar-steel with two double reverse curves therein, having its ends and the middle thereof bent in such shape for attachment to its supports and to the vehicle body or seat to be supported thereby that but short sections of the spring come in contact therewith, thus leaving the arms of the spring of sufficient length to secure the greatest available amount of elasticity therein consistent with its secure attachment to its supports and the vehicle body or seat; fourth, to combine supporting-blocks with the ends of a double reverse-curve vehicle or seat spring and with the top of the spring for supporting the vehicle body or seat resting on such spring-blocks, so as to secure the greatest amount of elasticity in the arms and curves of the spring consistent with its being perfectly secured in place.

Other features of my invention appear hereinafter in the specification and claims.

My improved spring and the mechanism thereof are illustrated in the drawings accompanying this specification and forming part thereof, as follows:

Figure 1 shows one form of my improved spring secured to a wagon-axle and under the wagon-body. Fig. 2 shows in elevation another form of the same spring on a section of a wagon-axle under a section of a wagon-body. Fig. 3 shows another means of separating straight sections of the spring from contact with the support and weight-bearing attachment. Fig. 4 shows another modification of one of the curves of the spring. Fig. 5 shows in perspective a portion of the running-gear of a wagon and a wagon-body and seat thereon with my improved springs under the body of the wagon and also under the wagon-seat. Fig. 6 shows in elevation my improved spring and a modification of the method of attaching the same to its support and a vehicle-seat placed thereon.

Similar letters refer to like parts in all the figures.

In the construction of my improved spring I use flat bar-steel, preferably in a single piece, but with double reverse or S-shaped curves, preferably in the form shown in Figs. 1, 3, 5, and 6, though in some instances I bend it in the form shown in Fig. 4, and again I make it of two parts hinged to a support in the middle of the upper part thereof, as shown in Fig. 2.

In the figures, E represents a wagon-body; B, a wagon-axle, and A the spring. D represents a block between the body and the middle of the top of the spring.

In Figs. 2, 4, and 6, $a\ a$ represent the two upper curves of the spring; $a'\ a'$, the lower curves of the spring.

In Figs. 1 and 6, $a^2\ a^2$ are the lower ends of the spring by which it is secured to the wagon-axle or other support therefor by a return bend, not necessarily without a block between the end and the part just above it.

The lower parts of the spring are supported on the axle or other bearing, preferably by the interposition of blocks $b\ b$, as shown in Figs. 2 and 4, and secured to the axle by means of clips C C, as shown in Figs. 1, 2, 3, and 4, or by bolts passing through the end of the spring. By means of the supporting-blocks $b\ b$, interposed at considerable distances from the curves between the ends of the arms and B or other support to which the spring is attached, the elasticity of the entire lengths of the arms is secured, and by the interposition of the block D in the same way between the top of the spring and the vehicle body or seat supported by the spring the elasticity of the greater portion of the upper section of the spring is utilized.

In Fig. 3 a modified shape of the spring is shown, by means of which the results heretofore described are secured by the shapes which are given to the top of the spring and the arms at c and c.

In Fig. 2 the spring is shown as constructed of two parts, and the block or support $D^2$ is provided with suitable means, A', for hinging the ends of the two sections of the spring thereto.

In Fig. 4 the modification shown illustrates a form of my spring, in which one side of it is bent with a larger curve, which can be applied to same parts of a vehicle or seat, giving greater ease of motion. I am thus able to reduce the thickness of the spring-bar and increase practically its elasticity, (the bars, if necessary, being double and still lighter,) and to secure a less amount of dead weight of steel than is obtained in any other self-supporting spring.

Throwing the most of the weight of the load near the ends of the axle in springs running parallel with it is new, and by the variety of straight and curved sections through which the jar or shock on the wheel must pass to the load great ease of motion is secured for the body of the vehicle and its load.

The double attachment of each spring to the axle gives one of the strongest and best axle attachments.

Any incidental use of the double reverse-curve spring heretofore made has secured only the elasticity in the curves. I more than double the elasticity by utilizing the straight sections of the spring by the means described. The binding of such springs with fixed ends is by these means much relieved.

What I claim as new, and desire to secure by Letters Patent, is—

1. In combination with a vehicle or seat spring constructed with double reverse curves, the blocks b b and block D, placed back from the curves, substantially as and for the purpose set forth.

2. The combination, with a wagon-axle, of the double reverse-curve springs and the separating-blocks set back from the curves, substantially as shown, at the attachment of the springs to the axle, together with the like means for connecting the wagon-body to the upper side of the springs, substantially as and for the purpose set forth.

3. A vehicle or seat spring constructed with two S-shaped curves, the upper part being bent, substantially as shown, to form a support (limited to the middle part of the section) for a seat or a vehicle-body, and the bottom arms thereof, c c, bent, substantially as shown, to form the limited bearing or supporting sections of the spring, substantially as set forth.

JEROME W. WETMORE.

Witnesses:
   WM. P. HAYES,
   WM. SPENCER.